Aug. 27, 1963   L. S. WATLINGTON ETAL   3,101,557
MODEL FOR USE IN THE ART OF HAIR STYLING
Filed Aug. 31, 1962

INVENTORS.
LEE S. WATLINGTON &
PAUL S. CAMPANELLA
BY
Threedy & Threedy
THEIR ATTORNEYS.

United States Patent Office 3,101,557
Patented Aug. 27, 1963

3,101,557
MODEL FOR USE IN THE ART OF
HAIR STYLING
Lee S. Watlington, 1204 N. Linden, Bloomington, Ill., and Paul S. Campanella, 4925 W. Pinchot, Phoenix 3, Ariz.
Filed Aug. 31, 1962, Ser. No. 220,602
5 Claims. (Cl. 35—59)

Our invention relates to a model for use in the art of hair styling and is particularly useful as a pattern to be followed by students and instructors in hair styling.

An object of our invention is the provision of a plurality of members some of which represent roller curlers and other pin curls, together with means which will permit such members to be releasably attached to a simulated head in position with respect to each other in accordance with the desired hair style.

Another object of the invention is to provide a model for use in the art of hair styling which is relatively simple in construction, one which permits the simulated roller curlers and pin curls to be readily located in their respective positions upon that portion of the head simulating the area of a head covered with hair.

Other objects will appear hereinafter.

The invention consists in the novel combination and arrangement of parts to be hereinafter described and claimed.

The invention will be best understood by reference to the accompanying drawings showing the preferred form of construction, and in which.

The several objects of our invention are preferably accomplished by the preferred form of construction shown in the accompanying drawings. In this connection, the model embodying our invention includes a simulated head 10 which may be formed of such material as will best serve the purpose. In the preferred form, the head is a shell formed of plastic and that area of the simulated head which represents the area of the head having hair thereon is coated with magnetically attractable material 11, such as iron or the like.

Figure 1:
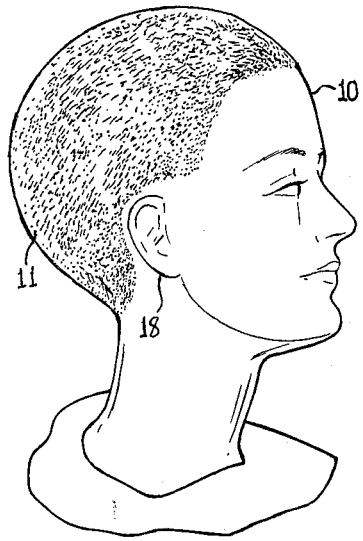
FIG. 1 is a perspective view of the simulated head embodied in our invention.
Figure 2:
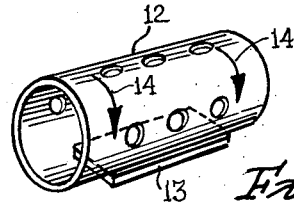
FIG. 2 is a perspective view of a simulated roller curler embodied in our invention.
Figure 3:
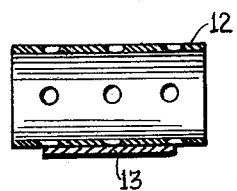
FIG. 3 is a longitudinal sectional view of the same.

The roller curler 12 is shown in the form of an elongated tube formed of plastic or other suitable material and which tube may or may not be perforated as shown. Attached to one side thereof is a permanent magnet 13 (see FIGS. 2 and 3). Printed, stamped or otherwise marked upon the cylindrical surface of the tube are arrows 14 which indicate to the student or instructor the direction in which the hair should be rolled to provide the roller curl.

Figure 4:
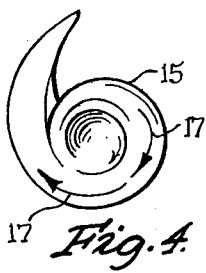
FIG. 4 is a plan view of a simulated pin curl embodied in our invention.
Figure 5:
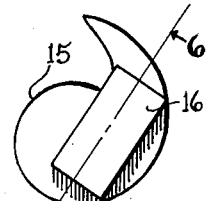
FIG. 5 is a bottom plan view of the same.
Figure 6:
FIG. 6 is a sectional detailed view taken substantially on line 6—6 of FIG. 5.
Figure 7:
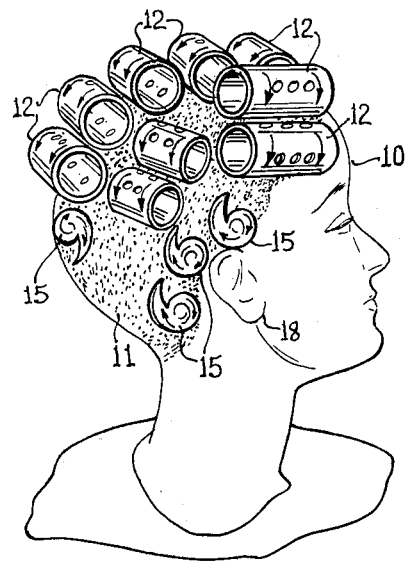
FIG. 7 is a perspective view of the model embodying the invention.
Figure 8:
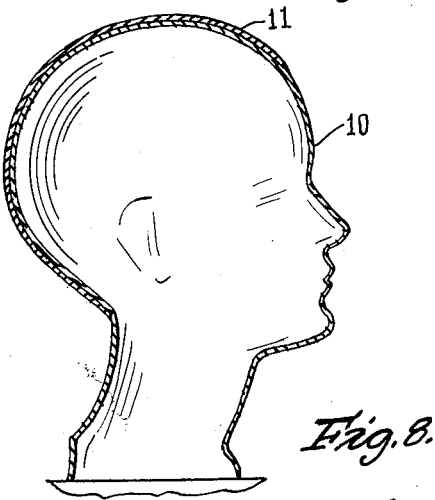
FIG. 8 is a vertical sectional detailed view of the simulated head shown in FIG. 1.

The simulated pin curl comprises a relatively flat disc 15 shaped to indicate the outline of the curl as shown in FIG. 4. On the bottom side of the disc 15 there is secured in any suitable manner a permanent magnet 16. The simulated pin curl disc 15 may be formed of any suitable material such as plastic or the like. On the disc 15, as shown in FIG. 4 are arrows 17, which like the arrows 14, indicate the direction in which the hair is to be wound in making the pin curl.

In use, the simulated head is supported in a vertical position in any suitable manner as by mounting the same on a base or the like.

The hair styling instructor selects a particular hair style. By use of the simulated roller curlers 12, the instructor places the latter in position upon the head within the area 11. The instructor also places within said area 11 the simulated pin curls 15 in the position with respect to each other as desired. The permanent magnets 13 and 16 cooperate with the magnetically attractable area 11 to releasably attach the simulated roller curler and pin curls to the simulated head. After the instructor has thus laid out on the simulated head the desired hair style, the model is now taken over by the student who uses the same as a pattern for producing the hair style simulated by the model on a head. By observing the direction of the arrows, the student will know in what direction to roll or wind the hair.

Various hair styles can be demonstrated on the simulated head by positioning the simulated roller curlers and pin curls in various positions with respect to each other and with respect to the simulated head 10.

While we have shown in the drawings the facial features of the head, it is to be understood that such features are not necessary to the invention. However, it is desirable that the ear 18 be shown on the simulated head since the ear may constiute a starting point for locating the simulated roller curlers and simulated pin curls.

From the foregoing it is obvious that we have provided a model which will be especially useful to the student and instructor alike in the art of hair styling. By the use of our model, the instructor, as well as the student, may have planned a simulated hair style to be followed in the production on the head of such hair style.

While we have illustrated and described the preferred form of construction for carrying our invention into effect, this is capable of variation and modification without departing from the spirit of the invention. We, therefore, do not wish to be limited to the precise details of construction set fourth, but desire to avail ourselves of such variations and modifications as come within the scope of the appended claims.

Having thus described our invention, what we claim as new and desire to protect by Letters Patent is:

1. A model for use in the art of hair styling comprising
   (a) a simulated head having an area of magnetic attractable material simulating the area of a head covered by hair,
   (b) a plurality of members each adapted to be placed within said area in various positions with respect to each other to simulate a hair style,
   (c) and magnetic means carried by each of said members and cooperating with said magnetic attractable material for releasably attaching said members to said simulated head within said area.

2. A model for use in the art of hair styling comprising
   (a) a simulated head having an area of magnetic attractable material simulating the area of a head covered by hair,
   (b) a plurality of tubular members simulating roller curlers each adapted to be placed within said area in various positions with respect to each other to simulate a hair style,
   (c) and magnetic means carried by each of said members and cooperating with said magnetic attractable material for releasably attaching said members to said simulated head within said area.

3. A model for use in the art of hair styling comprising (a) a simulated head having an area simulating the hair covered portion of a head,
(b) members simulating roller curlers,
(c) other members simulating pin curls,
(d) said members adapted to be placed within said area in various positions with respect to each other to simulate a hair style, and
(e) magnetic means for releasably attaching said members to said simulated head within said area.

4. A model for use in the art of hair styling comprising
(a) a simulated head having an area simulating the hair covered portion of a head,
(b) members simulating roller curlers,
(c) other members simulating pin curls,
(d) said members adapted to be placed within said area in various positions with respect to each other to simulate a hair style,
(e) means for releasably attaching said members to said simulated head within said area,
(f) and means on said members to indicate the direction hair should be wound to provide roller curlers and pin curls.

5. A model for use in the art of hair styling comprising
(a) a simulated head having an area simulating the hair covered portion of a head,
(b) members simulating roller curlers,
(c) other members simulating pin curls,
(d) said members adapted to be placed within said area in various positions with respect to each other to simulate a hair style,
(e) magnetic means for releasably attaching said members to said simulated head within said area,
(f) and means on said members to indicate the direction hair should be wound to provide roller curlers and pin curls.

References Cited in the file of this patent

UNITED STATES PATENTS

| | | |
|---|---|---|
| 2,165,476 | Greneker | July 11, 1939 |
| 2,941,314 | Schweiger | June 21, 1960 |
| 2,975,534 | Lutz | Mar. 21, 1961 |
| 3,001,530 | Julian | Sept. 26, 1961 |

FOREIGN PATENTS

| | | |
|---|---|---|
| 474,714 | Germany | Apr. 8, 1929 |

OTHER REFERENCES

Modern Beauty Shops Magazine (p. 25 relied on), December 1960.